United States Patent
Zhang

(10) Patent No.: US 11,956,829 B2
(45) Date of Patent: Apr. 9, 2024

(54) MESSAGING FOR RANDOM ACCESS PROCEDURES

(71) Applicant: ZTE Corporation, Guangdong (CN)

(72) Inventor: Li Zhang, Guangdong (CN)

(73) Assignee: ZTE Corporation, Guangdong (CN)

( * ) Notice: Subject to any disclaimer, the term of this patent is extended or adjusted under 35 U.S.C. 154(b) by 483 days.

(21) Appl. No.: 17/213,902

(22) Filed: Mar. 26, 2021

(65) Prior Publication Data

US 2021/0219348 A1 Jul. 15, 2021

Related U.S. Application Data

(63) Continuation of application No. PCT/CN2018/107767, filed on Sep. 26, 2018.

(51) Int. Cl.
| | |
|---|---|
| *H04W 74/0833* | (2024.01) |
| *H04L 1/1867* | (2023.01) |
| *H04W 72/0446* | (2023.01) |
| *H04W 72/0453* | (2023.01) |
| *H04W 72/23* | (2023.01) |
| *H04W 74/00* | (2009.01) |
| *H04W 80/02* | (2009.01) |

(52) U.S. Cl.
CPC ....... *H04W 74/0833* (2013.01); *H04L 1/1896* (2013.01); *H04W 72/0446* (2013.01); *H04W 72/0453* (2013.01); *H04W 72/23* (2023.01); *H04W 74/004* (2013.01); *H04W 80/02* (2013.01)

(58) Field of Classification Search
CPC ......... H04W 74/0833; H04W 72/0446; H04W 72/0453; H04W 72/23; H04W 74/004; H04W 80/02; H04L 1/1896; H04L 1/08; H04L 1/18; Y02D 30/70
See application file for complete search history.

(56) References Cited

U.S. PATENT DOCUMENTS

| | | | |
|---|---|---|---|
| 2015/0289292 A1 | 10/2015 | Sun et al. | |
| 2018/0270869 A1 | 9/2018 | Tsai | |
| 2018/0279376 A1* | 9/2018 | Dinan | ................... H04W 52/50 |

(Continued)

FOREIGN PATENT DOCUMENTS

| | | |
|---|---|---|
| CN | 107006037 | 8/2017 |
| CN | 108271275 | 7/2018 |

(Continued)

OTHER PUBLICATIONS

Co-Pending CN Application No. 201880099781.0, CN Office Action dated Aug. 2, 2022, 21 pages with unofficial translation.

(Continued)

*Primary Examiner* — Steven Hieu D Nguyen
(74) *Attorney, Agent, or Firm* — Perkins Coie LLP

(57) ABSTRACT

A method of wireless communication includes repeatedly transmitting, from a mobile device to a communication node, a first message using increasing power levels for initiating a two-step random-access procedure until a termination condition is met. The first message includes a payload part and optionally a preamble sequence. The termination condition includes (1) the mobile device receives an indication from the communication node that the payload part was received successfully, or (2) a number of repeated transmissions reaches a threshold.

18 Claims, 11 Drawing Sheets

(56) References Cited

U.S. PATENT DOCUMENTS

| | | | | |
|---|---|---|---|---|
| 2018/0368175 | A1* | 12/2018 | Jeon | H04W 72/04 |
| 2019/0320467 | A1* | 10/2019 | Freda | H04L 5/0055 |
| 2019/0357266 | A1 | 11/2019 | Ren et al. | |
| 2020/0100297 | A1* | 3/2020 | Agiwal | H04B 17/327 |
| 2020/0212987 | A1* | 7/2020 | Priyanto | H04W 74/0833 |
| 2020/0404711 | A1 | 12/2020 | Zhao et al. | |

FOREIGN PATENT DOCUMENTS

| | | |
|---|---|---|
| CN | 108282897 A | 7/2018 |
| WO | 2018/127042 | 7/2018 |
| WO | 2018127226 A1 | 7/2018 |

OTHER PUBLICATIONS

International Search Report and Written Opinion in International Application No. PCT/CN2018/107767, dated Jun. 25, 2019, 6 pages.

OPPO. "Two-steps RACH procedure for NR-U" 3GPP TSG-RAN WG2 Meeting #103 R2-1811067, Aug. 24, 2018 (Aug. 24, 2018), 4 pages.

Co-Pending CN Application No. 201880099781.0, Notification to Complete Formalities of Registration dated Mar. 4, 2023, 4 pages with unofficial translation.

* cited by examiner

300

1500

US 11,956,829 B2

MESSAGING FOR RANDOM ACCESS PROCEDURES

CROSS-REFERENCE TO RELATED APPLICATIONS

This application is a continuation of International Patent Application No. PCT/CN2018/107767, filed on Sep. 26, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for enabling a simplified two-step random access procedure to reduce time delay for mobile devices to gain access to the network.

In one example aspect, a wireless communication method is disclosed. The method includes repeatedly transmitting, from a mobile device to a communication node, a first message using increasing power levels for initiating a two-step random-access procedure until a termination condition is met. The first message includes a payload part and optionally a preamble sequence. The termination condition includes (1) the mobile device receives an indication from the communication node that the payload part was received successfully, or (2) a number of repeated transmissions reaches a threshold.

In another example aspect, a wireless communication method is disclosed. The method includes transmitting, from a mobile device to a communication node, a first message for initiating a two-step random-access procedure. The method also includes receiving, at the mobile device, a second message from the communication node indicating a status of the two-step random-access procedure. The second message includes at least one of: a random-access response, an identifier for a contention resolution, or a MAC service data unit (SDU).

In yet another example aspect, a wireless communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

Figure 1A:
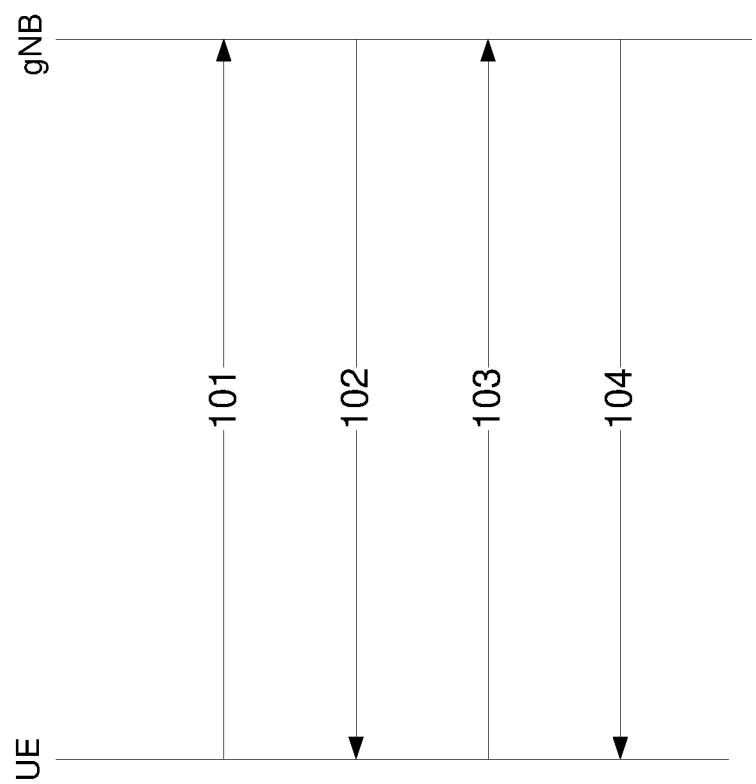
FIG. 1A depicts an example of the 4-step random access procedure used in the Long-Term Evolution (LTE) wireless communication systems.

In the Long-Term Evolution (LTE) wireless communication systems, a 4-step procedure is used for establishing random access to the network by mobile devices. FIG. 1A depicts an example of the 4-step random access procedure used in LTE wireless communication systems. As shown in FIG. 1A, a mobile device such as a user equipment (UE) transmits a Msg1 (101) that includes a preamble with a Random Access Radio Network Temporary Identifier (RA- RNTI). The base station (e.g., base station) then transmits a Msg2 that includes Random Access Response (RAR) data. If UE successfully decodes the Physical Downlink Control Channel (PDCCH), it can decode the Physical Downlink Shared Channel (PDSCH) carrying the RAR data. After decoding the RAR data, the UE checks to see if Random Access Preamble Index (RAPID) in the RAR data matches the RAPID assigned to the UE. The UE then transmits Msg3 (103) over the PUSCH on the same serving cell. The base station then transmits Msg4 including contention resolution information. Again, if the UE successfully decodes the PDCCH, the UE can decode PDSCH carrying the Medium Access Control (MAC) Control Element (CE). This random access procedure is then considered successfully completed.

Figure 1B:
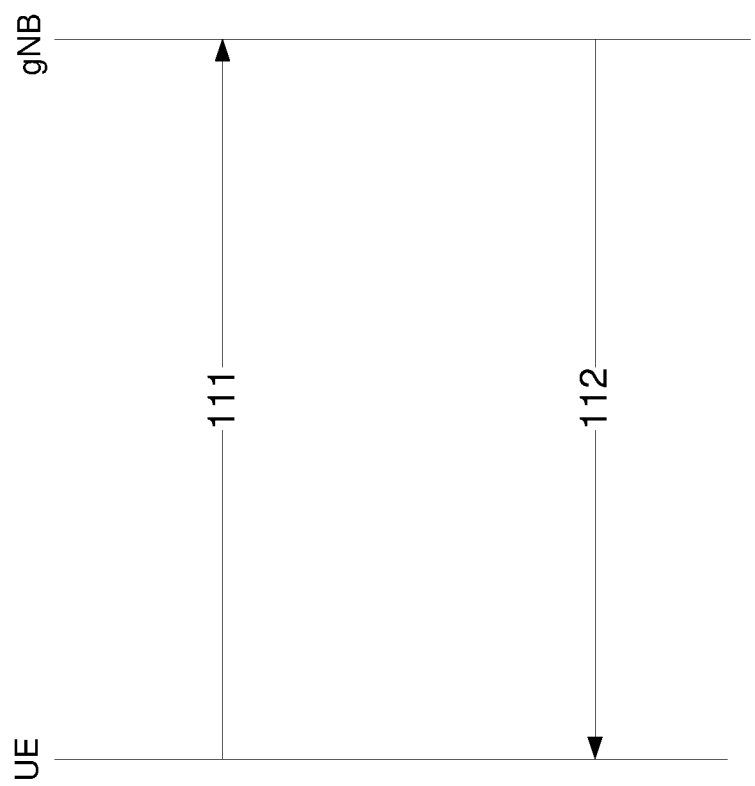
FIG. 1B shows an example of a 2-step random access procedure.

In the 4-step RACH procedure, the first two steps are intended to acquire an uplink timing alignment (TA) and scheduling grant. With the development of New Radio (NR) technologies, the TA acquisition may become unnecessary in some scenarios. It is thus more desirable to adopt a simplified random access procedure to reduce access delay in establishing random access for the mobile devices. FIG. 1B shows an example of a simplified 2-step random access procedure. In the 2-step RACH procedure, the UE sends a first message 111 (e.g., new Msg1) to the base station (e.g., base station). The first message 111 includes information from Msg1 and Msg3 of the 4-step random access procedure. The base station then transmits a second message 112 to indicate the completion of the 2-step random access procedure, or a fallback to the 4-step random access procedure.

Transmitting of the new Msg1 over the PUSCH may be unreliable, and retransmissions of new Msg1 may be necessary in various scenarios. This patent document describes various retransmission techniques that can be used to increase reliability of the new Msg1 transmissions. Furthermore, the second message 112 (e.g., new Msg2) can include information from Msg2 and Msg4 of the 4-step random access procedure. This patent document describes several structures that can be used for the new Msg2 in various scenarios.

In addition, when the UE is in the connected state, the Cell Radio Network Temporary Identifier (C-RNTI) is used for scrambling the contention resolution information. If the new Msg2 uses the RA-RNTI for scrambling, the new Msg2 needs to include the C-RNTI to allow the UE to perform contention resolution. This patent document further includes details to allow flexible definition of the Medium Access Control (MAC) Control Element (CE) to accommodate different lengths of C-RNTI and RA-RNTI to reduce signaling overhead.

Some examples of the disclosed techniques are described in the following example embodiments.

Embodiment 1

This embodiment describes the scenario of retransmitting the new Msg1 when the UE detects a transmission failure, such as receiving a Non-Acknowledgment (NACK) from the base station or detecting that base station fails to send any response with the response window.

Figure 2:
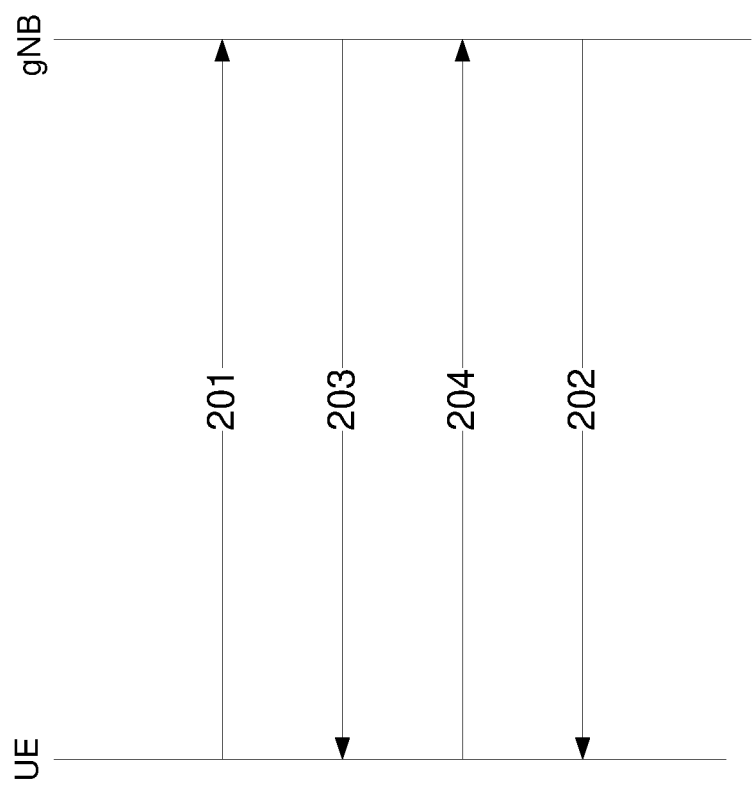
FIG. 2 depicts an example of a retransmission after the UE receives a NACK from the base station in accordance with one or more embodiments of the present technology.

FIG. 2 depicts an example of a retransmission after the UE receives a NACK from the base station. As shown in FIG. 2, the UE transmits a new Msg1 (201) to the base station to initiate the 2-step random access procedure. The new Msg1 includes a preamble and a payload. The base station successfully detects that the preamble included in the new Msg1 (201) and performs the Demodulation Reference Signal (DMRS) demodulation. However, in this case, the payload demodulation fails. The base station can obtain information of the UE through the DMRS. The base station then indicates the payload demodulation failure by sending a NACK message (203) to the UE through the PDCCH. By transmitting the NACK message (203), the base station allows the UE to perform non-adaptive retransmissions using UE's own resources, thereby increasing the probability of successful reception of the payload in subsequent transmissions.

In some embodiments, the base station configures a response window for the UE. The response window is similar to the Random Access Response Window in the 4-step procedure. In some implementations, the response window starts when the UE sends the new Msg1. The window is terminated when the UE receives a NACK from the base station. The window can also be restarted each time the payload or the new Msg1 is retransmitted. If the UE fails to receive any indication (e.g., a NACK, a dynamic grant, or other types of messages) from the base station within the response window, the UE may consider that a transmission failure of the new Msg1 has happened and react in the same way as receiving a NACK from the base station.

Figure 3:
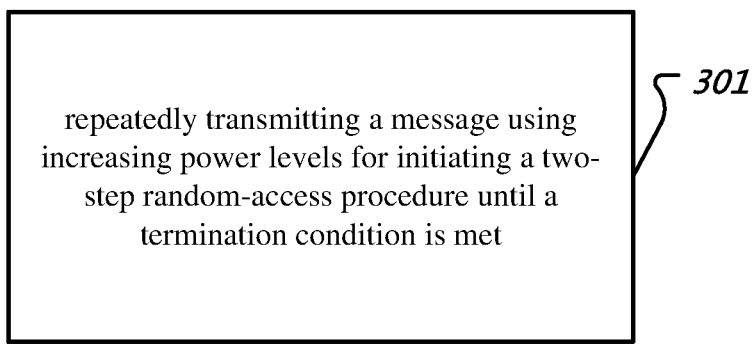
FIG. 3 is a flowchart representation of a method for wireless communication in accordance with one or more embodiments of the present technology.

FIG. 3 is a flowchart representation of a method 300 for wireless communication. After receiving the NACK (or detecting an equivalent scenario), the UE may repeatedly transmit, as shown in step 301 of FIG. 3, a message (e.g., Msg1 or payload) using increasing power levels until a termination condition is met. For example, the UE can stop retransmitting the new Msg1 or payload when the UE receives an indication from the base station indicating successful reception of the payload.

In some embodiments, re-transmissions of the new Msg1 or payload can be performed using increasing power levels to increase the likelihood of successful demodulation at the base station. In some embodiments, a maximum number of transmissions of new Msg1 or payload can be defined. The UE stops retransmitting the new Msg1 or payload if the number of retransmission reaches the maximum number allowed.

In some implementations, two separate counters can be used to track the number of payload re-transmissions and the corresponding payload power ramping levels. For example, after the UE receives a NACK from the base station, it increases a first counter to track the number of payload retransmissions. It also increases a second counter to track the power ramping level for payload retransmissions. The UE then retransmits the payload alone or with the same preamble. When the first counter that tracks the number of payload retransmissions reaches the corresponding threshold (e.g., the maximum number of retransmissions), the UE stops payload retransmissions and moves to select a different preamble. The two counters are then reinitialized.

In some embodiments, the maximum number of preamble retransmissions (that is, retransmissions using different preambles) can be defined. In some implementations, two additional counters can be used: one counter is used to track how many times the UE re-selects the preamble and the other is used to track the corresponding preamble power ramping levels for different new Msg1 transmissions. For example, after the UE re-selects a different preamble, the UE forms a different new Msg1 using the different preamble and the same payload. The two additional counters are incremented to track whether the number of preamble retransmissions has reached the maximum.

Embodiment 2

This embodiment describes the scenario of retransmitting the new Msg1 when the UE receives a dynamic grant from the base station.

Figure 4:
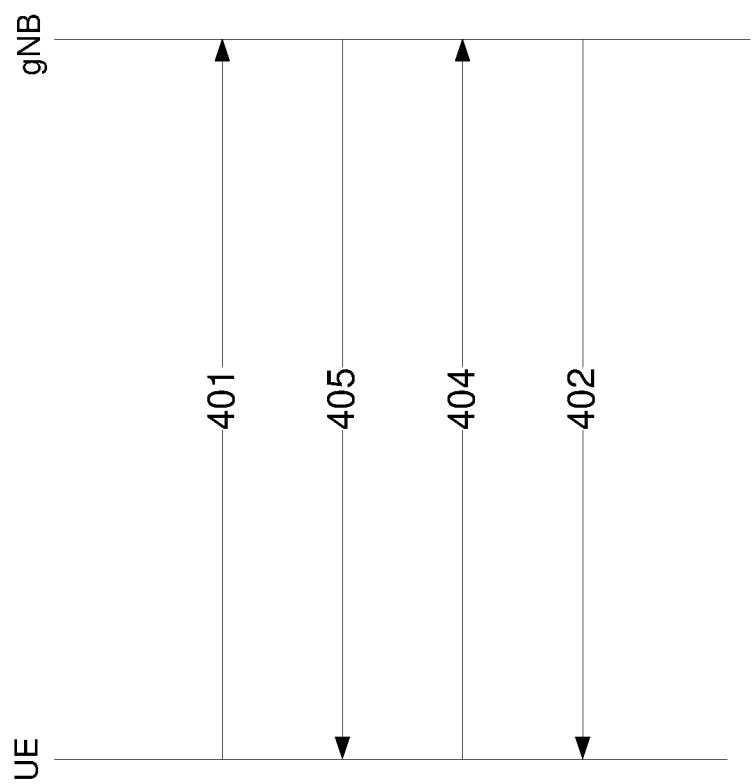
FIG. 4 depicts an example of a retransmission after the UE receives a dynamic grant from the base station in accordance with one or more embodiments of the present technology.

FIG. 4 depicts an example of a retransmission after the UE receives a dynamic grant from the base station. As shown in FIG. 4, the UE transmits a new Msg1 (401) to the base station to initiate the 2-step random access procedure. The new Msg1 includes a preamble and a payload. The base station successfully detects that the preamble included in the new Msg1 (401) and performs the DMRS demodulation. However, in this case, the payload demodulation fails. The base station obtains information of the UE through the DMRS and transmits a dynamic grant (405) to indicate one or more transmission opportunities or transmission resources in the time-frequency domain. After receiving the dynamic grant, the UE performs multiple Listen Before Talk (LBT) attempts according to the grant until the LBT succeeds. The UE then retransmits the payload using the PUSCH resources.

Referring back to FIG. 3, after receiving the grant, the UE may repeatedly transmit, at step 301, a message (e.g., Msg1 or payload) using increasing power levels until a termination condition is met. For example, the UE can stop retransmitting the new Msg1 or payload when the UE receives an indication from the base station indicating successful reception of the payload.

In some embodiments, re-transmissions of the new Msg1 or payload can be performed using increasing power levels to increase the likelihood of successful demodulation at the base station. In some embodiments, a maximum number of transmissions of new Msg1 or payload can be defined. The UE stops retransmitting the new Msg1 or payload if the number of retransmission reaches the maximum number allowed.

In some implementations, two separate counters can be used to track the number of payload re-transmissions and the corresponding payload power ramping levels. For example, after the UE receives a NACK from the base station, it increases a first counter to track the number of payload retransmissions. It also increases a second counter to track the power ramping level for payload retransmissions. The UE then retransmits the payload alone or with the same preamble. When the first counter that tracks the number of payload retransmissions reaches the corresponding threshold (e.g., the maximum number of retransmissions), the UE stops payload retransmissions and moves to select a different preamble. The two counters are then reinitialized.

In some embodiments, the maximum number of preamble retransmissions (that is, retransmissions using different preambles) can be defined. In some implementations, two additional counters can be used: one counter is used to track how many times the UE re-selects the preamble and the other is used to track the corresponding preamble power ramping levels for different new Msg1 transmissions. For example, after the UE re-selects a different preamble, the UE forms a different new Msg1 using the different preamble and the same payload. The two additional counters are incremented to track whether the number of preamble retransmissions has reached the maximum.

Embodiment 3

This embodiment describes the scenario of retransmitting the new Msg1 when Channel Occupancy Time (COT) sharing is used.

As shown in FIG. 2 and/or FIG. 4, the UE transmits a new Msg1 (201/401) to the base station to initiate the 2-step random access procedure. The new Msg1 includes a preamble and a payload. The base station successfully detects that the preamble included in the new Msg1 (201/401) and performs the DMRS demodulation. However, in this case, the payload demodulation fails. The base station obtains information of the UE through the DMRS. In some embodiments, Channel Occupancy Time (COT) sharing can be adopted to reduce the impact of LBT. For example, the base station can indicate either a NACK or a dynamic grant within the same COT. Such way, no LBT or fast LBT is performed by the base station, thereby reducing the impact of LBT on downstream transmissions. After receiving the indication from the base station, the UE then retransmits the new Msg1 or the payload.

Referring back to FIG. 3, after receiving the NACK or grant, the UE may repeatedly transmit, at step 301, a message (e.g., Msg1 or payload) using increasing power levels until a termination condition is met. For example, the UE can stop retransmitting the new Msg1 or payload when the UE receives an indication from the base station indicating successful reception of the payload.

In some embodiments, re-transmissions of the new Msg1 or payload can be performed using increasing power levels to increase the likelihood of successful demodulation at the base station. In some embodiments, a maximum number of transmissions of new Msg1 or payload can be defined. The UE stops retransmitting the new Msg1 or payload if the number of retransmission reaches the maximum number allowed.

In some implementations, two separate counters can be used to track the number of payload re-transmissions and the corresponding payload power ramping levels. For example, after the UE receives a NACK from the base station, it increases a first counter to track the number of payload retransmissions. It also increases a second counter to track the power ramping level for payload retransmissions. The UE then retransmits the payload alone or with the same preamble. When the first counter that tracks the number of payload retransmissions reaches the corresponding threshold (e.g., the maximum number of retransmissions), the UE stops payload retransmissions and moves to select a different preamble. The two counters are then reinitialized.

In some embodiments, the maximum number of preamble retransmissions (that is, retransmissions using different preambles) can be defined. In some implementations, two additional counters can be used: one counter is used to track how many times the UE re-selects the preamble and the other is used to track the corresponding preamble power ramping levels for different new Msg1 transmissions. For example, after the UE re-selects a different preamble, the UE forms a different new Msg1 using the different preamble and the same payload. The two additional counters are incremented to track whether the number of preamble retransmissions has reached the maximum.

Embodiment 4

Even when the UE is capable of performing both the 4-step random access procedure and the simplified 2-step random access procedure, the network may configure the type of procedures performed by the UE according to the service type. For example, for the Ultra Reliable Low Latency Communication (URLLC) services, the base station may configure the UE to trigger a 2-step random access procedure to reduce the random access delay. In some embodiments, the random access type can be configured for each logical channel in the logical channel configuration, thereby increasing the flexibility of random access by mobile devices.

Take the Information Element (IE) LogicalChannelConfig as an example. The random access type can be indicated as follows:

LogicalChannelConfig::=SEQUENCE {
    ul-SpecificParameters SEQUENCE {
    priority INTEGER (1 . . . 16),
    prioritisedBitRate ENUMERATED {kBps0, kBps8, kBps16, kBps32, kBps64, kBps128, kBps256, kBps512, kBps1024, kBps2048, kBps4096, kBps8192, kBps16384, kBps32768, kBps65536, infinity},
    bucketSizeDuration ENUMERATED {ms5, ms10, ms20, ms50, ms100, ms150, ms300, ms500, ms1000, spare7, spare6, spare5, spare4, spare3, spare2, spare1},
    allowedServingCells SEQUENCE (SIZE (1 . . . maxNrofServingCells−1)) OF ServCellIndex
    OPTIONAL, -- Need R
    allowedSCS-List SEQUENCE (SIZE (1 . . . maxSCSs)) OF SubcarrierSpacing
    OPTIONAL, -- Need R
    maxPUSCH-Duration ENUMERATED {ms0p02, ms0p04, ms0p0625, ms0p125, ms0p25, ms0p5, spare2, spare1}
    OPTIONAL, -- Need R
    configuredGrantType1Allowed ENUMERATED {true}
    logicalChannelGroup INTEGER (0 . . . maxLCG-ID)
    schedulingRequestID SchedulingRequestId
    logicalChannelSR-Mask BOOLEAN,
    logicalChannelSR-DelayTimerApplied BOOLEAN,
    ach-Type ENUMERATED{4-step, 2-step} OPTIONAL,
--Need M
. . .
}

For random access procedures triggered by uplink data arrival, the UE may trigger a corresponding type of random access procedure according to which current logical channel has available data. If there are multiple logical channels available, each having a different type of the random access procedure, the UE may select one by itself. For example, in some embodiments, the UE selects a 2-step random access procedure for transmissions that have higher priority or more strict timing requirements.

Embodiment 5

This embodiment describes an example of the new Msg2 that includes contention free random access (CFRA) information, random access response (RAR) for both the 2-step and 4-step random access procedures, and information about contention resolution.

Figure 5:
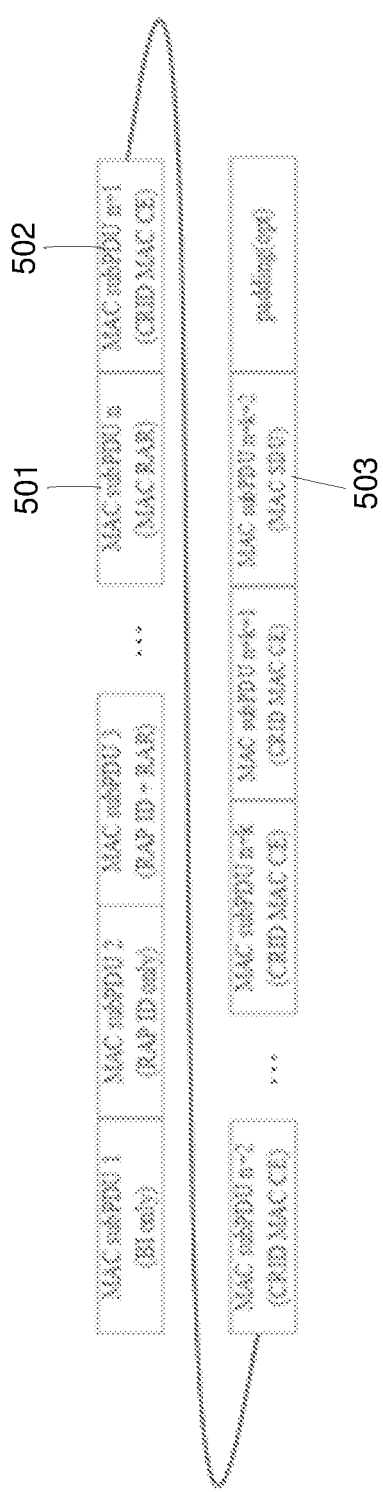
FIG. 5 shows an example of a new Msg2 structure in accordance with one or more embodiments of the present technology.

If a cell supports both the 2-step and 4-step random access procedures as well as the contention free based random access procedures, it is desirable to include MAC RAR for all these types of procedures in the new Msg2 to reduce signaling overhead. For example, the 2-step new Msg2 can include a MAC RAR message, contention resolution identifier (ID), and a MAC Service Data Unit (SDU), whose content can be different in different scenarios. When the cell's contention free MAC RAR, 4-step MAC RAR, 2-step MAC RAR, CRID, and MAC SDU are present at the same time, it is important to decide how to organize messages together. This embodiment describes a scheme of positioning CFRA, 4-step MAC RAR, and 2-step MAC RAR before the CRID MAC CE and MAC SDU such that air interface signaling overhead can be reduced. Two example options are provided below:

Scheme 1-1: In this scheme, the CRID is sent to the UE through a MAC CE (e.g., the CRID MAC CE). FIG. 5 shows an example of the new Msg2 structure according to this scheme. As shown in FIG. 5, the MAC RAR is positioned closer to the beginning of the new Msg2 in subPDU n (501), followed by the CRID MAC CE in subPDU n+1 (502). The MAC Service Data Unit (SDU) is positioned after the CRID MAC CE in SubPDU n+k+2 (503). In some embodiments, the MAC RAR has a correspondence with the subsequent CRID MAC CE and the MAC SDU.

Figure 6:
FIG. 6 shows another example of a new Msg2 structure in accordance with one or more embodiments of the present technology.

Scheme 1-2: In this scheme, the CRID is positioned in the MAC RAR. In cases where MAC RAR and MAC SDU are both included in the new Msg2, the MAC RAR is positioned first, followed by the MAC SDU. FIG. 6 shows an example of the new Msg2 structure according to this scheme. In FIG. 6, the MAC RAR that includes the CRID is positioned in subPDU n (601), before the MAC SDU in subPDU n+1 (602). In some embodiments, the MAC RAR may have a correspondence with MAC SDU.

In some embodiments, the UE can match the contention resolution based on the correspondence between the MAC RAR and the MAC CE and/or MAC SDU. For example, the UE determines that the random access is successful when the CRID is matched successfully. If no CRID can be matched successfully, the random access procedure is deemed to have failed. The UE may retransmit the new Msg 1 based on whether the maximum number of retransmissions is reached.

Embodiment 6

This embodiment describes another example of the new Msg2 that includes CFRA information, random access response (RAR) for both the 2-step and 4-step random access procedures, and information about contention resolution.

Figure 7:
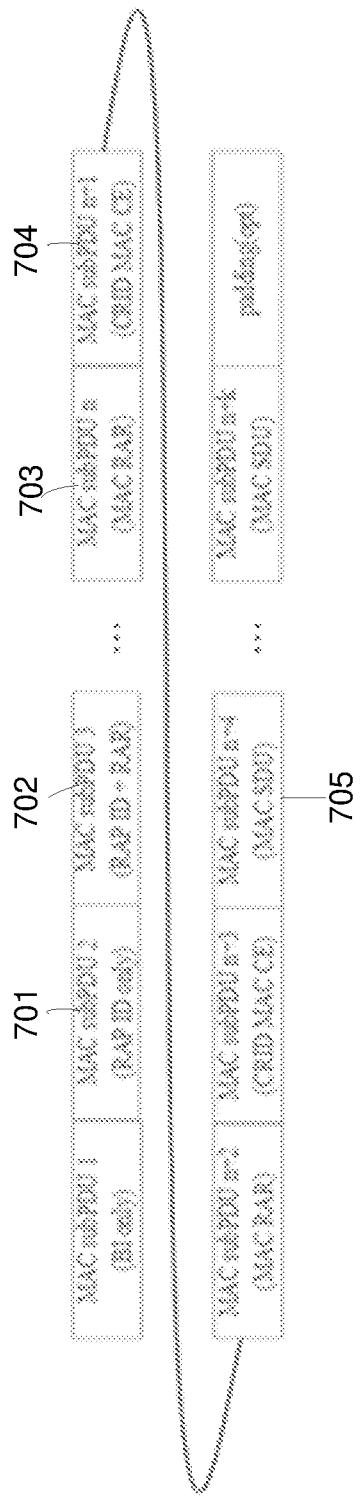
FIG. 7 shows another example of a new Msg2 structure in accordance with one or more embodiments of the present technology.

As discussed above, if a cell supports both the 2-step and 4-step random access procedures as well as the contention free based random access procedures, it is desirable to include MAC RAR for all these types of procedures in the new Msg2 to reduce signaling overhead. When the cell's contention free MAC RAR, 4-step MAC RAR, 2-step MAC RAR, CRID, and MAC SDU are present at the same time, it is important to decide how to organize messages together. This embodiment describes another scheme of positioning CFRA, 4-step MAC RAR, and 2-step RAR before the MAC CE, and MAC SDU such that air interface signaling overhead can be reduced. Two example options are provided below:

Scheme 2-1: In this scheme, the CRID is sent to the UE through a MAC CE (e.g., the CRID MAC CE). FIG. 7 shows an example of the new Msg2 structure according to this scheme. As shown in FIG. 7, the Random Access Preamble Index (RAPID)-only part is positioned in sub-PDU2 (701) close to the beginning of the new Msg2, followed by RAPID and RAR in subPDU 3 (702). The MAC RAR and CRID MAC CE are positioned subsequently in subPDU n (703) and subPDU n+1 (704). The MAC SDU is positioned after the MAC RAR and CRID MAC CE in subPDU n+4 (705). In some embodiments, the MAC RAR and CRID MAC CE that have a correspondence are positioned adjacent to each other. It is noted that the positions of CRID MAC CE and MAC RAR in this scheme are interchangeable so long as the correspondence remains the same.

Figure 8:
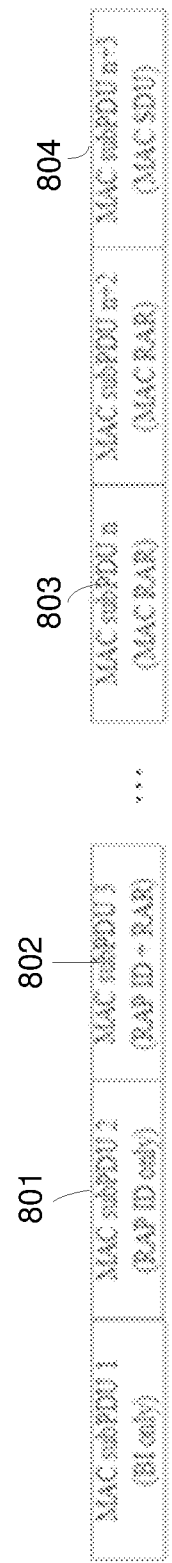
FIG. 8 shows another example of a new Msg2 structure in accordance with one or more embodiments of the present technology.

Scheme 2-2: In this scheme, the CRID is positioned in the MAC RAR. FIG. 8 shows an example of the new Msg2 structure according to this scheme. As shown in FIG. 8, RAPID-only part is positioned first in subPDU 2 (801), followed by RAPID and RAR in subPDU 3 (802). The MAC RAR, which includes the CRID, is positioned subsequently (e.g., in subPDU n (803)). The MAC SDU is positioned last in subPDU n+3 (804).

In some embodiments, the UE can match the contention resolution based on the correspondence between the MAC RAR and the MAC CE and/or MAC SDU. For example, the UE determines that the random access is successful when the CRID is matched successfully. If no CRID can be matched successfully, the random access procedure is deemed to have failed. The UE may retransmit the new Msg 1 based on whether the maximum number of retransmissions is reached.

Embodiment 7

This embodiment describes another example of the new Msg2 that includes CFRA information, random access response (RAR) for both the 2-step and 4-step random access procedures, and information about contention resolution.

For the 2-step random access procedures, the new Msg2 content can be different and the UE ID can be different for different scenarios. For scenarios in the connected state, the base station can detect which UE initiates the random access procedure, thereby scrambling the new Msg2 using C-RNTI. However, if the UE is in the idle or inactive state, the base station has not allocated the C-RNTI. In such cases, the new Msg2 can be scrambled by the RA-RNTI.

Figure 9:
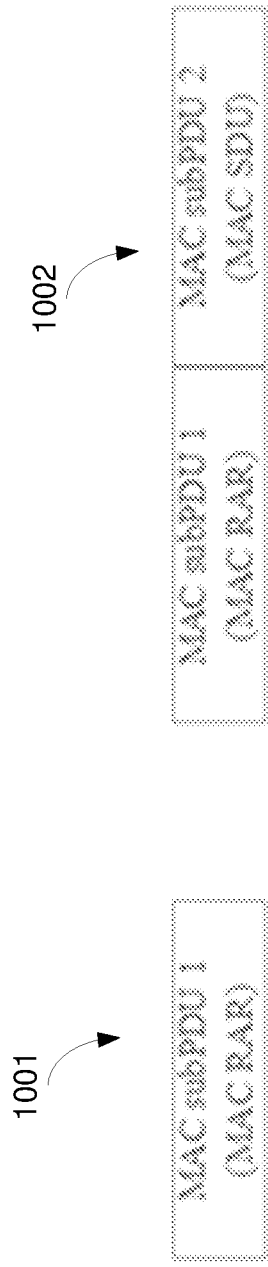
FIG. 9 shows two examples of new Msg2 structures in accordance with one or more embodiments of the present technology.

When the UE is in the idle or inactive state, the new Msg2 can be structured according to examples shown in the embodiment 5 or embodiment 6 to reduce signaling overhead. When the UE is in the active state, the new Msg2 can be structured to increase reliability of the transmissions. Two example options are provided below:

Scheme 3-1: In this scheme, the CRID is sent to the UE through a MAC CE (e.g., the CRID MAC CE). FIG. 9 shows two examples of the new Msg2 structures in two different scenarios according to this scheme. In the first scenario 901, only MAC RAR and CRID MAC CE are present. In some embodiments, the MAC RAR may correspond to the CRID MAC CE, and the positions of MAC RAR and CRID MAC CE are interchangeable. In the second scenario 902, MAC RAR, CRID MAC CE, and MAC SDU are all present. The MAC SDU is positioned after the MAC RAR and CRID MAC CE. Similarly, in some embodiments, the MAC RAR may correspond to the CRID MAC CE, and the positions of MAC RAR and CRID MAC CE are interchangeable.

Figure 10:
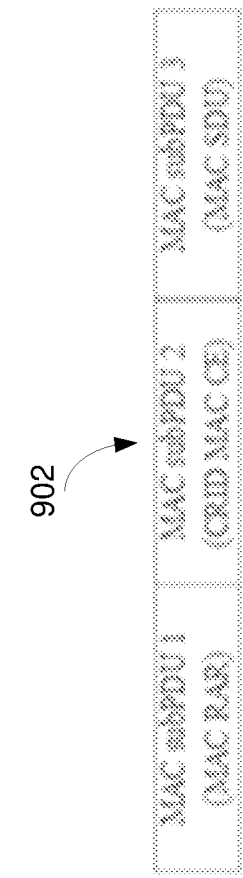
FIG. 10 shows another two examples of new Msg2 structures in accordance with one or more embodiments of the present technology.

Scheme 3-2: In this scheme, the CRID is positioned in the MAC RAR. FIG. 10 shows two examples of the new Msg2 structures in two different scenarios according to this scheme. In the first scenario 1001, only MAC RAR (which includes the CRID) is present. In the second scenario 902, MAC RAR and MAC SDU are both present. The MAC SDU is positioned after the MAC RAR.

The UE needs to listen to the RA-RNTI and the C-RNTI because it may fall back to the 4-step random access procedure due to the PUSCH parsing failure. When the UE detects the RA-RNTI and matches the preamble, the UE may perform a 4-step random access procedure, and send the Msg3 of the 4-step procedure according to the information in the MAC RAR. When the UE detects the C-RNTI and performs contention resolution successfully, the random access procedure is considered complete.

Embodiment 8

This embodiment describes an example of the new Msg2 that is applicable to 2-step random access procedures only. If a cell supports only the 2-step random access procedures, the new Msg2 may include the Backoff Indicator (BI) MAC subheader, MAC RAR, CRID MAC CE and/or MAC SDU. This embodiment describes a scheme of positioning such information in the new Msg2. Two example options are provided below:

Scheme 4-1: In this scheme, the CRID is sent to the UE through a MAC CE (e.g., the CRID MAC CE). Referring back to FIG. 5, the MAC RAR is positioned closer to the beginning of the new Msg2 in subPDU n (501), followed by the CRID MAC CE in subPDU n+1 (502). The MAC SDU is positioned after the CRID MAC CE in SubPDU n+k+2 (503). In some embodiments, the MAC RAR has a correspondence with the subsequent CRID MAC CE and the MAC SDU.

Scheme 4-2: In this scheme, the CRID is positioned in the MAC RAR. In cases where MAC RAR and MAC SDU are both included in the new Msg2, the MAC RAR is positioned first, followed by the MAC SDU. Referring back to FIG. 6, the MAC RAR that includes the CRID is positioned in subPDU n (601), before the MAC SDU in subPDU n+1 (602). In some embodiments, the MAC RAR may have a correspondence with MAC SDU.

In some embodiments, the UE can match the contention resolution based on the correspondence between the MAC RAR and the MAC CE and/or MAC SDU. For example, the UE determines that the random access is successful when the CRID is matched successfully. If no CRID can be matched successfully, the random access procedure is deemed to have failed. The UE may retransmit the new Msg 1 based on whether the maximum number of retransmissions is reached.

Embodiment 9

This embodiment describes another example of the new Msg2 that is applicable to 2-step random access procedures only. If a cell supports only the 2-step random access procedures, the new Msg2 may include the Backoff Indicator (BI) MAC subheader, MAC RAR, CRID MAC CE and/or MAC SDU. This embodiment describes another scheme of positioning such information in the new Msg2. Two example options are provided below:

Scheme 5-1: In this scheme, the CRID is sent to the UE through a MAC CE (e.g., the CRID MAC CE). Referring back to FIG. 7, the RAPID-only part is positioned in sub-PDU2 (701) close to the beginning of the new Msg2, followed by RAPID and RAR in subPDU 3 (702). The MAC RAR and CRID MAC CE are positioned subsequently in subPDU n (703) and subPDU n+1 (704). The MAC SDU is positioned after the MAC RAR and CRID MAC CE in subPDU n+4 (705). In some embodiments, the MAC RAR and CRID MAC CE that have a correspondence are positioned adjacent to each other. It is noted that the positions of CRID MAC CE and MAC RAR in this scheme are interchangeable so long as the correspondence remains the same.

Scheme 5-2: In this scheme, the CRID is positioned in the MAC RAR. Referring back to FIG. 8, RAPID-only part is positioned first in subPDU 2 (801), followed by RAPID and RAR in subPDU 3 (802). The MAC RAR, which includes the CRID, is positioned subsequently (e.g., in subPDU n (803)). The MAC SDU is positioned last in subPDU n+3 (804).

In some embodiments, the UE can match the contention resolution based on the correspondence between the MAC RAR and the MAC CE and/or MAC SDU. For example, the UE determines that the random access is successful when the CRID is matched successfully. If no CRID can be matched successfully, the random access procedure is deemed to have failed. The UE may retransmit the new Msg 1 based on whether the maximum number of retransmissions is reached.

Embodiment 10

This embodiment describes another example of the new Msg2 that is applicable to 2-step random access procedures only. If a cell supports only the 2-step random access procedures, the new Msg2 may include the Backoff Indicator (BI) MAC subheader, MAC RAR, CRID MAC CE and/or MAC SDU.

When the UE is in the idle or inactive state, the new Msg2 can be structured according to examples shown in the embodiment 9 or embodiment 10 to reduce signaling overhead. When the UE is in the active state, the new Msg2 can be structured to increase reliability of the transmissions. Two example options are provided below:

Scheme 6-1: In this scheme, the CRID is sent to the UE through a MAC CE (e.g., the CRID MAC CE). Referring back to FIG. 9, in the first scenario 901, only MAC RAR and CRID MAC CE are present. In some embodiments, the MAC RAR may correspond to the CRID MAC CE, and the positions of MAC RAR and CRID MAC CE are interchangeable. In the second scenario 902, MAC RAR, CRID MAC CE, and MAC SDU are all present. The MAC SDU is positioned after the MAC RAR and CRID MAC CE. Similarly, in some embodiments, the MAC RAR may correspond to the CRID MAC CE, and the positions of MAC RAR and CRID MAC CE are interchangeable.

Scheme 6-2: In this scheme, the CRID is positioned in the MAC RAR. Referring back to FIG. 10, in the first scenario 1001, only MAC RAR (which includes the CRID) is needed. In the second scenario 902, MAC RAR and MAC SDU are both needed. The MAC SDU is positioned after the MAC RAR.

The UE needs to listen to the RA-RNTI and the C-RNTI because it may fall back to the 4-step random access procedure due to the PUSCH parsing failure. When the UE detects the RA-RNTI and matches the preamble, the UE may perform a 4-step random access procedure, and send the Msg3 of the 4-step procedure according to the information in the MAC RAR. When the UE detects the C-RNTI and performs contention resolution successfully, the random access procedure is considered complete.

Embodiment 11

Figure 11:
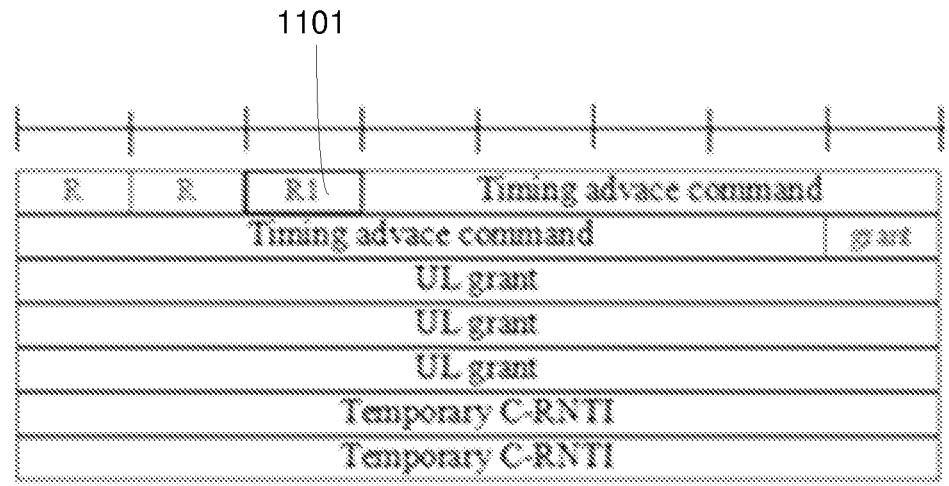
FIG. 11 shows an example of an indicator for indicating the type of random access procedure to be used in accordance with one or more embodiments of the present technology.

If both the preamble and the PUSCH are received successfully, the UE can perform the 2-step random access procedure. In cases where the preamble reception is successful but the PUSCH reception fails, the UE may fall back to the 4-step random access procedure. In some embodiments, the base station can inform the UE whether it can fall back to the 4-step procedure or continue to perform the 2-step random access procedure. FIG. 11 shows an example of an indicator for indicating the type of random access procedure to be used. As shown in FIG. 11, the R1 (1101) field in the MAC RAR message can be used to indicate whether the 2-step procedure or the 4-step procedure is to be used. For example, if the R1 field is 0, the UE is to adopt the 4-step random access procedure. If the R1 field is 1, then the UE is to adopt a 2-step random access procedure.

Embodiment 12

In the 4-step random access procedure when the UE is in the connected state, the Msg2 carries the RA-RNTI-scrambled MAC RAR, and Msg4 carries the C-RNTI-scrambled PDCCH to perform the contention resolution. However, in the 2-step random access procedure, if new Msg2 is scrambled using RA-RNTI, the C-RNTI needs to be carried in the new Msg2 so that the UE can perform contention resolution.

Figure 12:
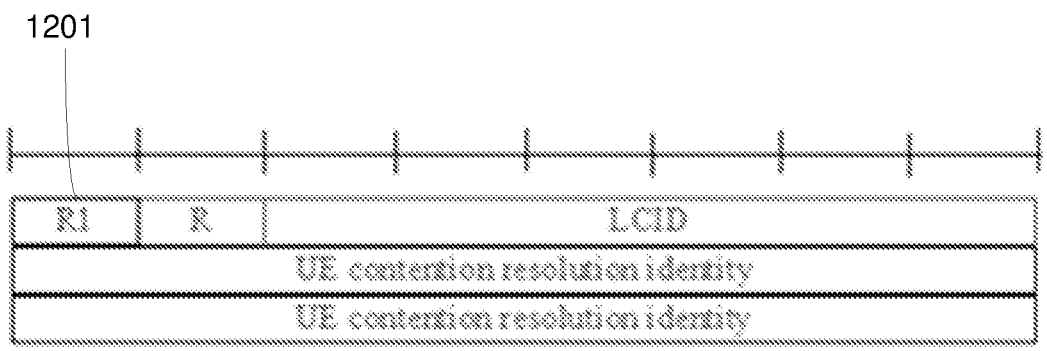
FIG. 12 shows an example of indicating Contention Resolution Identifier (CRID) formats in accordance with one or more embodiments of the present technology.

Currently, the CRID is carried in a 48-bit CRID MAC CE. If the UE is in the connected state, the C-RNTI can also be carried by the CRID MAC CE. Because the C-RNTI is only 16 bits, a 16-bit CRID MAC CE can be defined to reduce signaling overhead. For example, the 16-bit CRID MAC CE can be defined as the short CRID MAC CE and the 48-bit CRID MAC CE can be defined as the long CRID MAC CE. As shown in FIG. 12, a field in the MAC CE subheader R1 (1201) can be used to distinguish between these two formats. For example, when R1 is 1, the CRID MAC CE includes the long CRID (e.g., 48 bits). When R1 is 0, the CRID MAC CE includes the short CRID (e.g., 16 bits).

Figure 13:
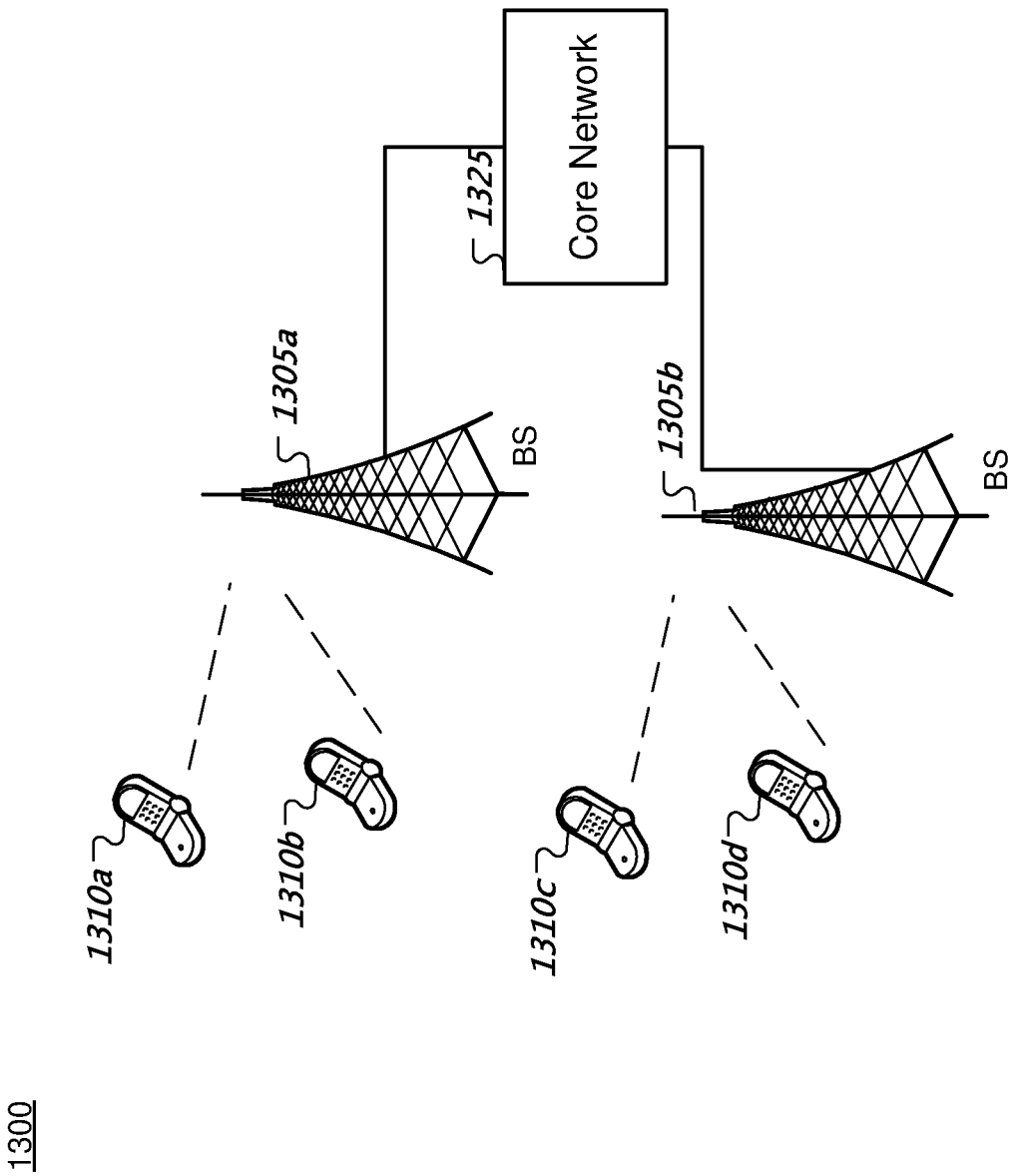
FIG. 13 shows an example of a wireless communication system where techniques in accordance with one or more embodiments of the present technology can be applied.

FIG. 13 shows an example of a wireless communication system 1300 where techniques in accordance with one or more embodiments of the present technology can be applied. A wireless communication system 1300 can include one or more base stations (BSs) 1305*a*, 1305*b*, one or more wireless devices 1310*a*, 1310*b*, 1310*c*, 1310*d*, and a core network 1325. A base station 1305*a*, 1305*b* can provide wireless service to wireless devices 1310*a*, 1310*b*, 1310*c* and 1310*d* in one or more wireless sectors. In some implementations, a base station 1305*a*, 1305*b* includes directional antennas to produce two or more directional beams to provide wireless coverage in different sectors.

The core network 1325 can communicate with one or more base stations 1305*a*, 1305*b*. The core network 1325 provides connectivity with other wireless communication systems and wired communication systems. The core network may include one or more service subscription databases to store information related to the subscribed wireless devices 1310*a*, 1310*b*, 1310*c*, and 1310*d*. A first base station 1305*a* can provide wireless service based on a first radio access technology, whereas a second base station 1305*b* can provide wireless service based on a second radio access technology. The base stations 1305*a* and 1305*b* may be co-located or may be separately installed in the field according to the deployment scenario. The wireless devices 1310*a*, 1310*b*, 1310*c*, and 1310*d* can support multiple different radio access technologies.

Figure 14:
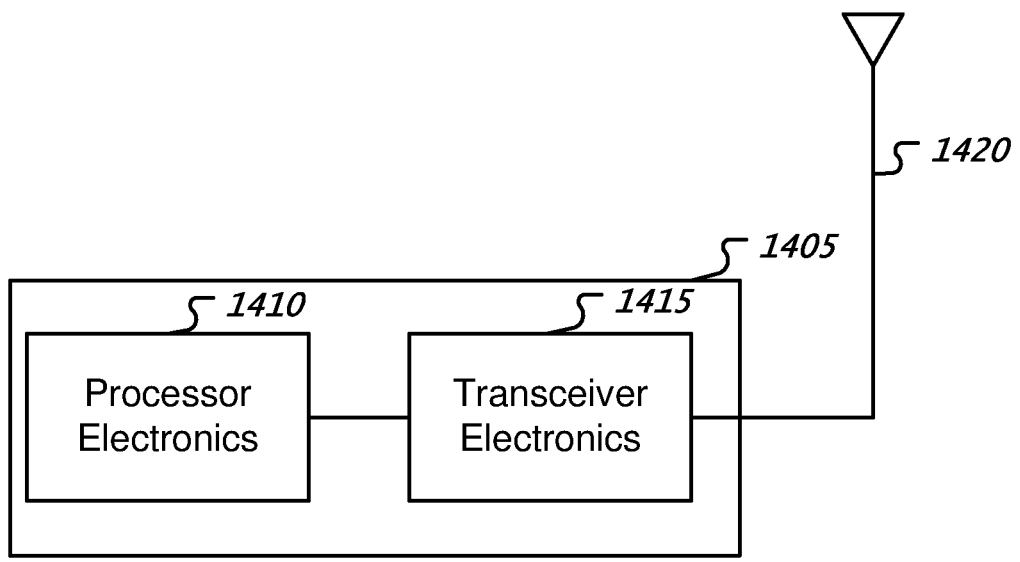
FIG. 14 is a block diagram representation of a portion of a radio station.

FIG. 14 is a block diagram representation of a portion of a radio station. A radio station 1405 such as a base station or a wireless device (or UE) can include processor electronics 1410 such as a microprocessor that implements one or more of the wireless techniques presented in this document. The radio station 1405 can include transceiver electronics 1415 to send and/or receive wireless signals over one or more communication interfaces such as antenna 1420. The radio station 1405 can include other communication interfaces for transmitting and receiving data. Radio station 1405 can include one or more memories (not explicitly shown) configured to store information such as data and/or instructions.

In some implementations, the processor electronics 1410 can include at least a portion of the transceiver electronics 1415. In some embodiments, at least some of the disclosed techniques, modules or functions are implemented using the radio station 1405.

Figure 15:
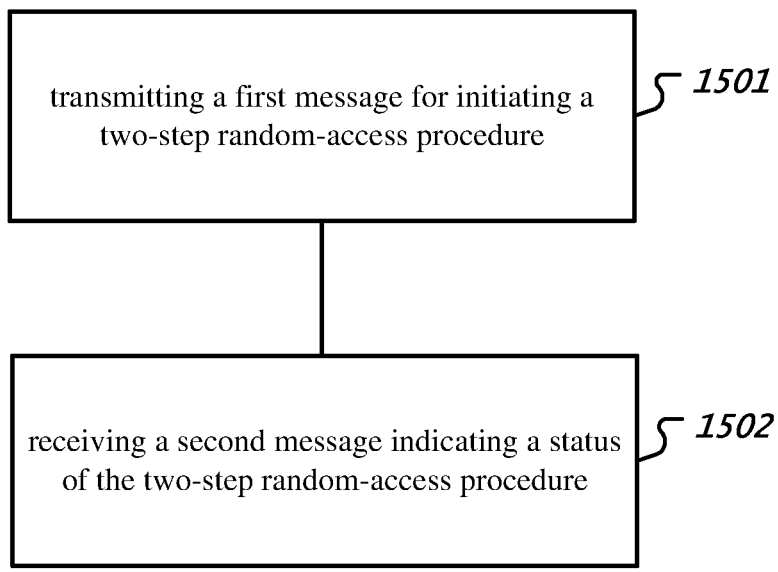
FIG. 15 is a flowchart representation of another method for wireless communication in accordance with one or more embodiments of the present technology.

FIG. 15 is a flowchart representation of another method for wireless communication. The method 1500 includes, at step 1501, transmitting, from a mobile device to a communication node, a first message for initiating a two-step random-access procedure. The method 1500 includes, at step 1502, receiving, at the mobile device, a second message from the communication node indicating a status of the two-step random-access procedure. The second message includes at least one of: a random-access response, an identifier for a contention resolution, or a MAC service data unit (SDU).

It will be appreciated that the present document discloses techniques that can be embodied into wireless communication systems to enable a simplified 2-step random access procedure to reduce time delay for the mobile devices to gain access to the network. Various embodiments have been disclosed to allow reliable transmissions of the messages (e.g., the new Msg1 and the new Msg2) while reducing signaling overhead.

In one example aspect, a wireless communication method is disclosed. The method includes repeatedly transmitting, from a mobile device to a communication node, a first message using increasing power levels for initiating a two-step random-access procedure until a termination condition is met. The first message includes a payload part and optionally a preamble sequence. The termination condition includes: (1) the mobile device receives an indication from the communication node that the payload part was received successfully, or (2) a number of repeated transmissions reaches a threshold.

In some embodiments, the method includes detecting, by the mobile device, a transmission failure of the payload part. In some implementations, the transmission failure is detected by receiving, at the mobile device, an indication from the communication node. The indication includes a non-acknowledgement (NACK) or a dynamic grant indicating retransmission opportunities in a time-frequency domain. In some implementations, the transmission failure is detected upon a determination that the mobile device fails to receive an indication from the communication node within a time-domain response window.

In some embodiments, the method includes selecting, by the mobile device, a second preamble sequence upon determining that the number of repeated transmissions reaches the threshold. The method also includes transmitting, from the mobile device, a second message to the communication node, wherein the second message includes the second preamble sequence and the payload part.

In some embodiments, the method includes receiving, prior to initiating the random-access procedure, a configuration message from the communication node. The configuration message includes a field to indicate whether a two-step random-access procedure or a four-step random-access procedure is to be used.

In some embodiments, the method includes incrementing a first counter to track the number of repeated transmissions of the first message. In some implementations, the method includes incrementing a second counter to track the power level used by the transmission of the first message.

In another example aspect, a wireless communication method is disclosed. The method includes transmitting, from a mobile device to a communication node, a first message for initiating a two-step random-access procedure; and receiving, at the mobile device, a second message from the communication node indicating a status of the two-step random-access procedure. The second message includes at least one of: a random-access response, an identifier for a contention resolution, or a MAC service data unit (SDU).

In some embodiments, the random-access response includes information for both the two-step random-access procedure and a four-step random-access procedure. In some embodiments, the second message includes contention-free random access information.

In some embodiments, the second message includes the random-access response and the identifier for the contention resolution. The identifier for the contention resolution is positioned in a MAC control element (CE). In some embodiments, the random-access response is associated with the MAC CE, and the positions of the random-access response and the MAC CE are interchangeable in the second message.

In some embodiments, the second message includes the random-access response and the identifier for the contention resolution. The identifier for the contention resolution is positioned within the random-access response.

In some embodiments, the second message further includes the MAC SDU, and the MAC SDU is associated with the random-access response and positioned after the random-access response.

In some embodiments, the second message indicates a completion the two-step random-access procedure. In some embodiments, the second message indicates a failure of the two-step random-access procedure. In some implementations, the method includes performing, by the mobile device, a four-step random-access procedure in response to the failure.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
repeatedly transmitting, from a mobile device to a communication node, a first message using increasing power levels for initiating a two-step random-access procedure until a termination condition is met, wherein the first message includes a payload part and a preamble sequence,
wherein transmitting the first message includes:
incrementing a first counter tracking a number of repeated transmissions of the payload part;
incrementing a second counter tracking a power ramping level corresponding to the repeated transmissions of the payload part;
and wherein the termination condition includes: the first counter tracking the number of repeated transmission of the payload part reaches a first threshold;
reselecting, by the mobile device, the preamble sequence upon determining that the first counter reaches the first threshold, wherein a number of times the preamble sequence is reselected is less than a second threshold;
transmitting, from the mobile device, a second message to the communication node, wherein the second message includes the reselected preamble sequence and the payload part;
incrementing a third counter tracking the number of times the preamble sequence is reselected; and
incrementing a fourth counter tracking a preamble power ramping level corresponding to the reselected preamble sequence.

2. The method of claim 1, comprising:
detecting, by the mobile device, a transmission failure of the payload part, wherein the transmission failure is detected by receiving, at the mobile device, an indication from the communication node, wherein the indication includes a non-acknowledgement (NACK) or a dynamic grant indicating retransmission opportunities in a time-frequency domain.

3. The method of claim 1, comprising:
detecting, by the mobile device, a transmission failure of the payload part, wherein the transmission failure is detected upon a determination that the mobile device fails to receive an indication from the communication node within a time-domain response window.

4. The method of claim 1, comprising:
receiving, prior to initiating the random-access procedure, a configuration message from the communication node, wherein the configuration message includes a field to indicate whether a two-step random-access procedure or a four-step random-access procedure is to be used.

5. The method of claim 1, wherein the termination condition is met when receiving an indication indicting a successful reception of the payload part from the communication node.

6. The method of claim 1, wherein the first counter and the second counter are initialized after the reselecting of the preamble sequence.

7. The method of claim 2, wherein the indication indicates the NACK or the dynamic grant within a same channel occupancy time (COT).

8. The method of claim 2, further comprising, after receiving the indication, performing, by the mobile device, multiple listen before talk (LBT) attempts according to the dynamic grant.

9. The method of claim 3, wherein the time-domain response window is configured by the communication node for the mobile device.

10. An apparatus of wireless communication apparatus, comprising
a memory;
a processor configured to: repeatedly transmit, to a communication node, a first message using increasing power levels for initiating a two-step random-access procedure until a termination condition is met, wherein the first message includes a payload part and a preamble sequence,
wherein the first message is transmitted by the processor further configured to:
increment a first counter tracking a number of repeated transmissions of the payload part;
increment a second counter tracking a power ramping level corresponding to the repeated transmissions of the payload part;
and wherein the termination condition includes: the first counter tracking the number repeated transmission of the payload part reaches a first threshold;
reselect the preamble sequence upon determining that the first counter reaches the first threshold, wherein a number of times the preamble sequence is reselected is less than a second threshold;
transmit a second message to the communication node, wherein the second message includes the reselected preamble sequence and the payload part;
increment a third counter tracking the number of times the preamble sequence is reselected; and
increment a fourth counter tracking a preamble power ramping level corresponding to the reselected preamble sequence.

11. The apparatus of claim 10, wherein the processor is configured to:
detect a transmission failure of the payload part, wherein the transmission failure is detected by receiving an indication from the communication node, wherein the indication includes a non-acknowledgement (NACK) or a dynamic grant indicating retransmission opportunities in a time-frequency domain.

12. The apparatus of claim 10, wherein the processor is configured to:
detect a transmission failure of the payload part, wherein the transmission failure is detected upon a failure to receive an indication from the communication node within a time-domain response window.

13. The apparatus of claim 10, wherein the processor is configured to:
receive, prior to initiating the random-access procedure, a configuration message from the communication node, wherein the configuration message includes a field to indicate whether a two-step random-access procedure or a four-step random-access procedure is to be used.

14. The apparatus of claim 10, wherein the termination condition is met when receiving an indication indicting a successful reception of the payload part from the communication node.

15. The apparatus of claim 10, wherein the first counter and the second counter are initialized after the reselecting of the preamble sequence.

16. The apparatus of claim 11, wherein the indication indicates the NACK or the dynamic grant within a same channel occupancy time (COT).

17. The apparatus of claim 11, further comprising, after receiving the indication, performing multiple listen before talk (LBT) attempts according to the dynamic grant.

18. The apparatus of claim 12, wherein the time-domain response window is configured by the communication node.

* * * * *